(12) United States Patent
Okamoto

(10) Patent No.: US 6,193,520 B1
(45) Date of Patent: *Feb. 27, 2001

(54) INTERACTIVE COMMUNICATION SYSTEM FOR COMMUNICATING VIDEO GAME AND KARAOKE SOFTWARE

(75) Inventor: Takeya Okamoto, Nagoya (JP)

(73) Assignee: Yugengaisha Adachi International, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/109,784

(22) Filed: Jul. 2, 1998

Related U.S. Application Data

(63) Continuation-in-part of application No. 08/642,560, filed on May 3, 1996, now Pat. No. 5,775,995.

(30) Foreign Application Priority Data

May 10, 1993 (JP) .................................................. 5-108303

(51) Int. Cl.[7] .............................. G09B 5/08; G10H 3/18; G10H 7/00; A63F 9/22
(52) U.S. Cl. .................................. 434/307 A; 434/307 R; 463/40; 84/610
(58) Field of Search ........................ 434/118, 307 R–309, 434/350, 365; 84/477 R, 610; 386/105, 126; 463/40–42; 455/6.3, 39, 66

(56) References Cited

U.S. PATENT DOCUMENTS

| | | |
|---|---|---|
| 5,018,736 | 5/1991 | Pearson et al. . |
| 5,236,199 | 8/1993 | Thompson , Jr. . |
| 5,250,747 | 10/1993 | Tsumura . |
| 5,273,288 | 12/1993 | Teshima et al. . |

*Primary Examiner*—Joe H. Cheng
(74) *Attorney, Agent, or Firm*—Davis and Bujold

(57) ABSTRACT

A communication system is proposed for transmitting at least one of the data, the program, and a combination of them from a host facility to a communicator such as a communication terminal device. In this communication system, the data or the program becomes unable to be used when a predetermined time has elapsed after it is transmitted from the host facility to the communicator. This communication system is provided with the function of giving a warning before the use of the transmission becomes unable and the function of resuming the use in accordance with the user's instruction even after the use becomes unable.

21 Claims, 12 Drawing Sheets

FIG.4

```
INPUT YOUR DESIRED GAME NUMBER AT
ITEM A OR SELECT EITHER OPERATION OF
ITEM B OR C

A: DESIRED GAME NUMBER  [    ]  305
    B: GAME NUMBER LIST
303 C: CHARGE
```

X: DESIRED GAME NUMBER  [ ] ←315
Y: EXPLANATION          [ ] ←317
Z: PRINT
                                    311

| GAME NUMBER | GAME NAME | NUMBER OF PLAYER | CHARGE |
|---|---|---|---|
| 1 | ···CART | 1–2 | (···) |
| 2 | ···PAINT | 1 | (···) |
| 3 | SUPER··· | 1–2 | (···) |
| 4 | ···LEGEND | 1–2 | (···) |
| 5 | STREET··· | 1–2 | (···) |

313

INTERACTIVE COMMUNICATION SYSTEM FOR COMMUNICATING VIDEO GAME AND KARAOKE SOFTWARE

This is a Continuation-in-Part of Application Ser. No. 08/642,560 filed May 3, 1996, now U.S. Pat. No. 5,775,995.

FIELD OF THE INVENTION

This invention relates to an interactive communication system for transmitting video game and karaoke software from a host facility to communication terminal devices.

BACKGROUND OF THE INVENTION

Video games have become a very popular form of family entertainment. In order to play a video game, a game cassette is first installed in a video game machine body. Game data, contained in the cassette and including video information and usually audio information, is read and outputted to a common television receiver. Accordingly, the one who wishes to play a video game must have a video game machine and a game cassette, besides a television set. Once the game cassette is installed, the player can play the game whenever and as many times as the player wishes.

However, therein lies a problem: the player has to purchase each and every game cassette he wishes to play, which can be very costly. For all the advantage that the player can play the game repeatedly, he may soon get tired of the game, or the game content may not be oriented for repeated play.

Another form of entertainment increasing in popularity is "karaoke", i.e. singing to recorded instrumental accompaniment. More and more "karaoke bars" can be seen in major cities, and karaoke machines for domestic use are becoming widely accepted. Such family karaoke machines need, by definition, karaoke music software, which can be found, for example, on video disk, video tape containing video and audio information, and music tape containing only audio information. Karaoke singers, tempted by changing trends in music, tend to purchase newly available karaoke programs, one after another. Thus, there arise problems of accumulated expenditure and limited storage space for the increasing number of karaoke programs.

SUMMARY OF THE INVENTION

Wherefore, an object of this invention is to provide an interactive communication system in which video game and karaoke software is transmitted via communication lines from a host facility to a calling communication terminal device at each individual home.

In order to attain the stated object, a communication terminal device according to the present invention includes communication means, connected to communication lines, for sending out or receiving data, and a computer for outputting control instructions to the communication means, and outputting or inputting data to or from the communication lines via the communication means. The communication terminal device further includes temporary storage means for temporarily storing the data inputted from the communication lines if the data inputted is game data including video information or video plus audio information, and game data outputting means included in the computer, for outputting, if the data stored in the temporary storage means is game data, the game data to integral or external display means, and, if the game data also includes audio information, to integral or external sound generating means.

In this way, the computer controls the communication means by supplying control instructions thereto. Data is thus sent out, under the control by the computer, via the communication means and the communication lines, or received via the communication lines and the communication means.

From another aspect of the invention, the computer may also include a printer, provided on the computer or provided externally, whereby, the data stored in the computer can be printed. For example, when the player wishes to quit game play, the current status of the game progress, e. g. which player corresponds to which character in the game, or the top scorer at the time, can be stored. When resuming the game, the player can refer to the printed data.

From still another aspect of the invention, a communication system according to the present invention includes the above described communication terminal device and a host facility intercommunicably connected to the communication terminal device. When the communication terminal device requests the host facility to provide game data, the host facility sends out the corresponding game data to the communication terminal device via the communication lines. The game data, received at the communication terminal device, is temporarily stored in the temporary storage means.

From a further aspect of the invention, the game data stored in the temporary storage means is deleted after a predetermined amount of time passes after the game data was received at the communication terminal device. In order to effect this deletion, the communication terminal device may include control means which operates, responsive to receipt of the game data, to delete the game data after a predetermined time period. Alternatively, the host facility may send an instruction concerning the time period, in addition to each game data it sends out. The latter alternative permits alteration of the time period with respect to each game.

By utilizing the communication system, the player need not purchase a game cassette or other software for playing video games, since the game data is provided by the host facility, which received the game data request sent by the player from his communication terminal device. Further, the game data provided to the player is temporarily stored in the temporary storage means of the communication terminal device, thereby releasing the host facility to serve other communication terminal devices requesting game data. The host facility is thus able to respond to a greater number of callers having communication terminal devices.

Furthermore, the game data stored in the temporary storage means is deleted in a predetermined time period after it was received at the communication terminal device. In other words, the useful life of the game data at the communication terminal devices is limited. As a result of this arrangement, in order to continue the game play at the end of the predetermined time period, the player again needs to request the game data from the host facility. This arrangement is therefore prerequisite so long as the game data transmission service is not free of charge. In contrast, if it were possible to keep the game data at the communication terminal device at the end of game play, the player could play the game permanently without calling the host facility. Consequently, the service cost per each transmission would be higher than the normal price of the game cassettes. The above described arrangement solves this problem and meets the need of software distributors.

The arrangement is also beneficial to players since the service cost per each transmission can be considerably lower than the price of each game cassette. Therefore, the game player who conventionally has to buy an expensive game cassette, even if he plays the game only once, can be satisfied with the reasonable cost of the transmission. The arrangement is also superior with respect to child discipline, since children can only play a limited time.

From still another aspect of the invention, the communication terminal device according to the present invention may be adapted for karaoke.

When the data input from the communication lines is a karaoke data, the temporary storage means temporarily stores the karaoke data, which is then outputted to a sound output device. The sound output device may be provided on the communication terminal device or provided externally. If the karaoke data also includes video information, the karaoke data is also output to a display. The display may also be provided on the communication terminal device or provided externally.

The communication system according to the present invention includes the above described communication terminal device and a host facility intercommunicably connected to the communication terminal device. Karaoke data is sent and received in a manner similar to the one described above for video games. The system may be configured so that the karaoke data is erased after a certain time period.

Other objects, advantages and novel features of the invention will become apparent from the following detailed description of the invention when considered in conjunction with the accompanying drawings, in which like reference characters designate the same or similar parts through the figures thereof.

BRIEF DESCRIPTION OF THE DRAWINGS

FIG. 4 is an example of screen display in accordance with the method of operation selection in the embodiment;

FIG. 5 is an example of screen display in accordance with the method of further operation selection in the embodiment;

DETAILED DESCRIPTION OF THE PREFERRED EMBODIMENT

In the embodiment of the invention, data, a program, or a combination of the two is transmitted from a host facility to a communicator as a communication terminal device. The data can be game data for playing games, karaoke data for playing karaoke music, image data for displaying static images like still pictures or dynamic images like movies, audio data for reproducing sound or playing music, character data for composing documents, and the like. The program includes a large-scale program, such as a program for word processing, a program for computing with a spread sheet, or a program for communication, and a plug-in-program to be incorporated in a main program. Transmitting a combination of the program and data means, for instance, transmitting a karaoke executing program and the data indicative of karaoke music to be played, or a set of a word processing program and the data indicative of document examples.

In the embodiment of the invention, when a predetermined time has elapsed after the host facility sends out the transmission to the communicator, the data or the program becomes unusable, preferably after a warning has been given. It is also preferable to have a way to resume the use in accordance with the user's instruction, even after the data or program becomes unusable.

Figure 2:
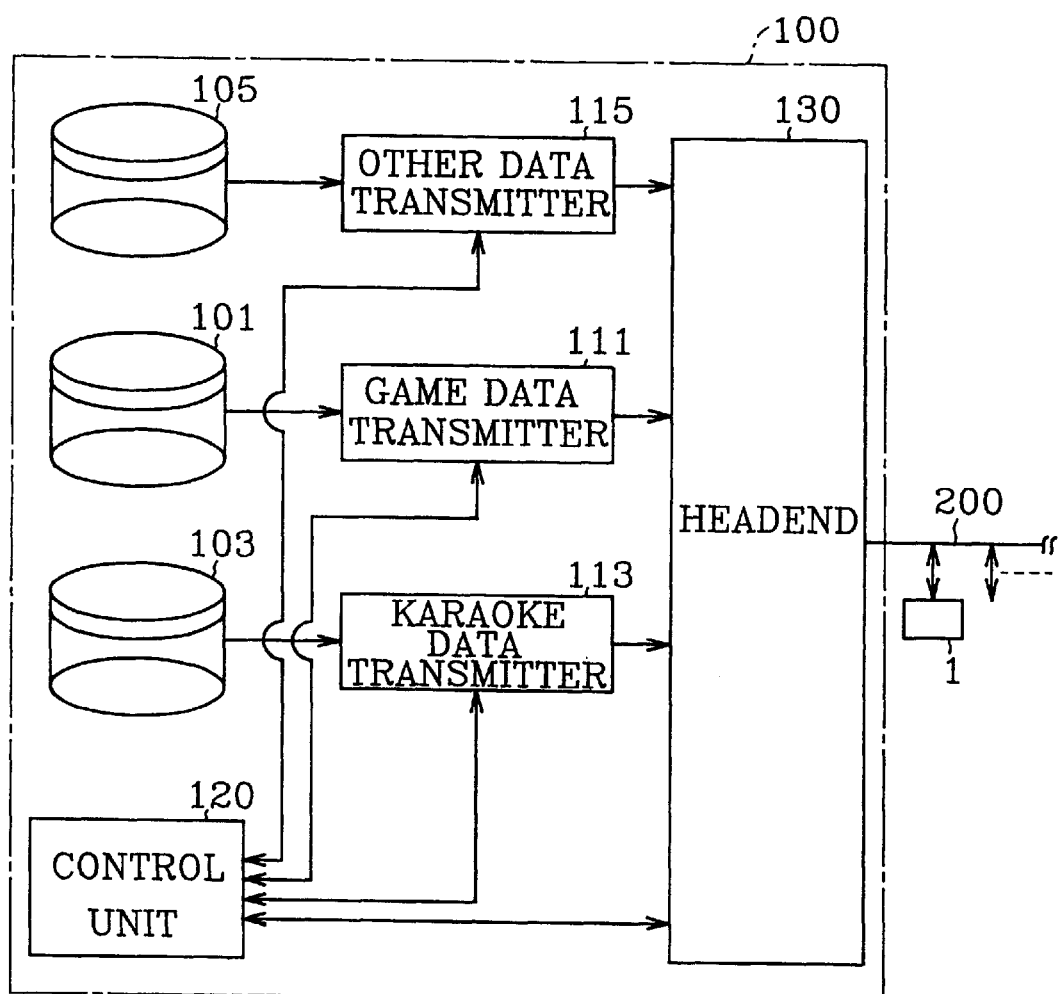
FIG. 2 is a block diagram of a communication system including the communication terminal device shown in FIG. 1.

As shown in FIG. 2, the communication system according to the present invention includes a host facility 100, a personal communicator 1 as a communication terminal device, and transmission paths 200 as communication lines.

The host facility 100 has game data base 101, karaoke data base 103 and other data base 105. The host facility 100 also has game data transmitter 111, karaoke data transmitter 113 and other data transmitter 115 to retrieve data from corresponding data base and transmit them. The host facility 100 further has control unit 120 to control the transmitters 111, 113 and 115, and a headend 130 to output or input signals.

When a request data is sent out from the personal communicator 1 via the transmission paths 200, the request data is received through the headend 130 and input by the control unit 120. The control unit 120 then controls one of the transmitters 111, 113 and 115 to retrieve data corresponding to the request, and the retrieved data is sent out via the headend 130 to the transmission paths 200.

The transmission paths 200 is coaxial cables and connected to a plurality of personal communicators 1.

Figure 1:
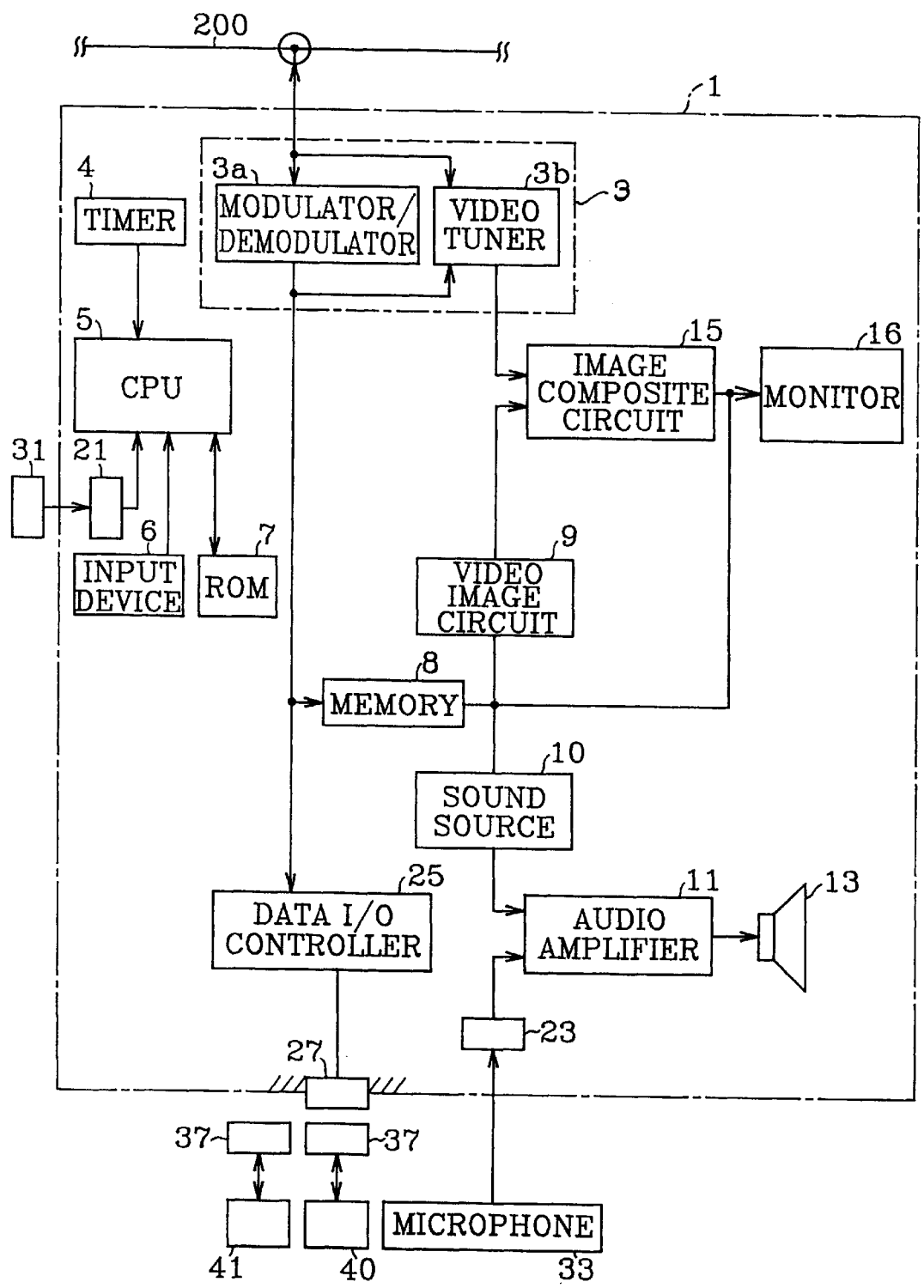
FIG. 1 is a block diagram of a communication terminal device according to the present invention.

As shown in FIG. 1, the personal communicator 1 includes a terminal modem 3, timer 4, CPU 5, input device 6, ROM 7, memory 8, video image circuit 9, sound source 10, audio amplifier 11, speaker 13, image composite circuit 15, monitor 16, controller connector 21, microphone connector 23, data input/output controller 25 and data input/output connector 27.

The terminal modem 3 is connected to the transmission paths 200 and includes modulator/demodulator 3a and video tuner 3b which selects a channel of the image to be projected.

The input device 6 may be a keyboard or mouse, and is used for inputting a designation of a desired game or karaoke data or other instructions. When a controller 31, which is exclusively used for playing video games, is connected to the controller connector 21, the controller 31 can be operated only for playing games. The controller 31 is provided with joy sticks or other control buttons commonly provided on conventional video game machines.

By connecting a microphone 33 to the microphone connector 23, the user can have his voice output to the speaker 13.

The data input/output connector 27 is connected via data output cable 37 to a printer 40, personal computer 41, or other apparatus.

Figure 3:
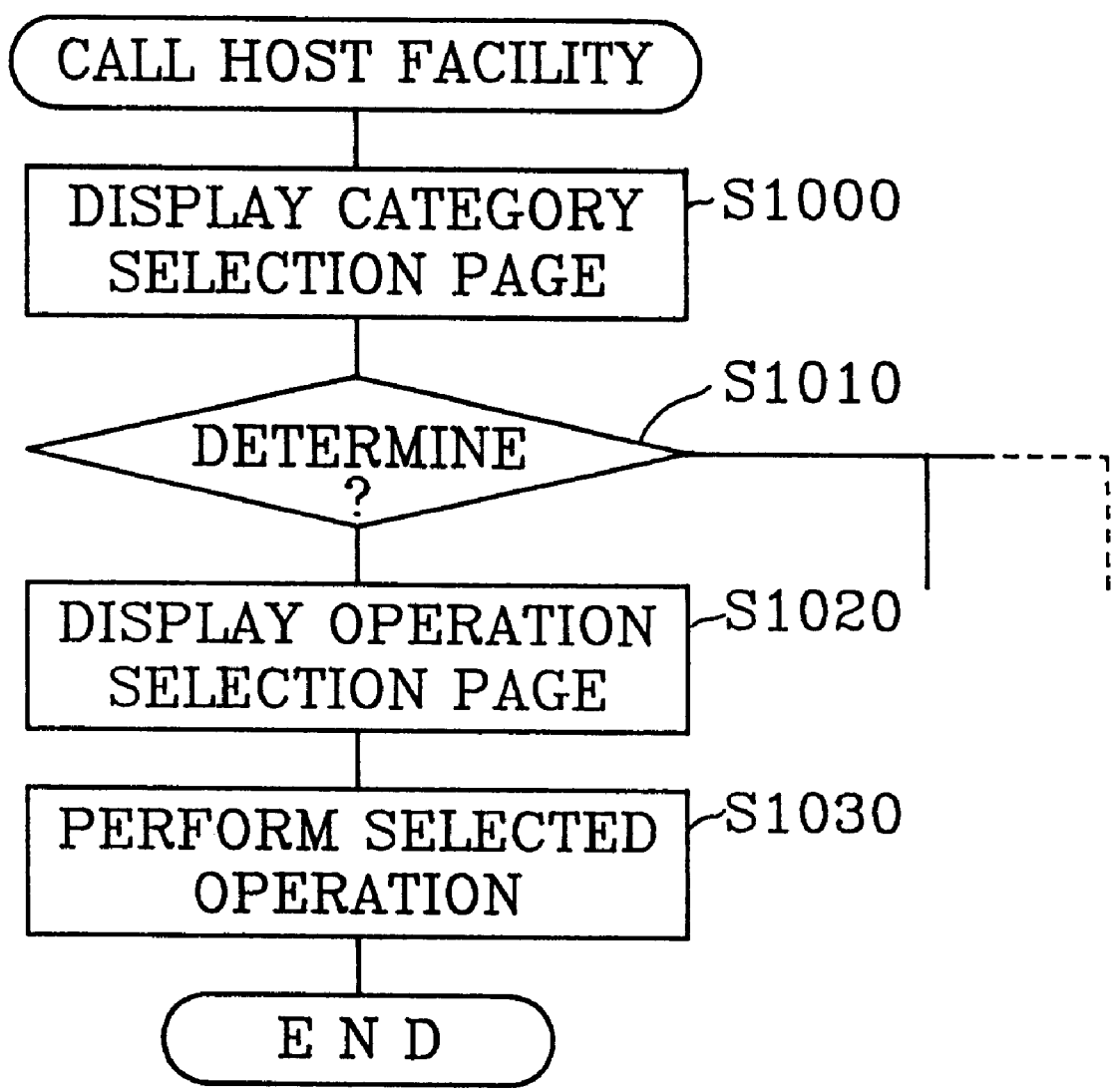
FIG. 3 is a flowchart of the process to call a host facility.

The operation effected on the CPU 5 will be now explained referring to the flowchart of FIG. 3.

When power is supplied, a main menu is displayed, offering various selections, including "call host facility", which is selected by a user.

First, category selection pages are displayed at step S1000. The display includes the instruction of "select a category" and a list of available categories such as game and karaoke. The selected category is next determined at step S1010. Subsequently, an operation selection page corresponding to the selected category is displayed at step S1020. The display of the operation selection page includes an instruction to the operator and the list of available operations in the selected category. When the operator inputs direction responsive to this instruction, the corresponding respective operation process is performed at step S1030. In preparation for the respective operation process, the personal communicator 1 is connected to the host facility 100 such that the interactive communication can be performed between the personal communicator 1 and the host facility 100.

Figure 6:
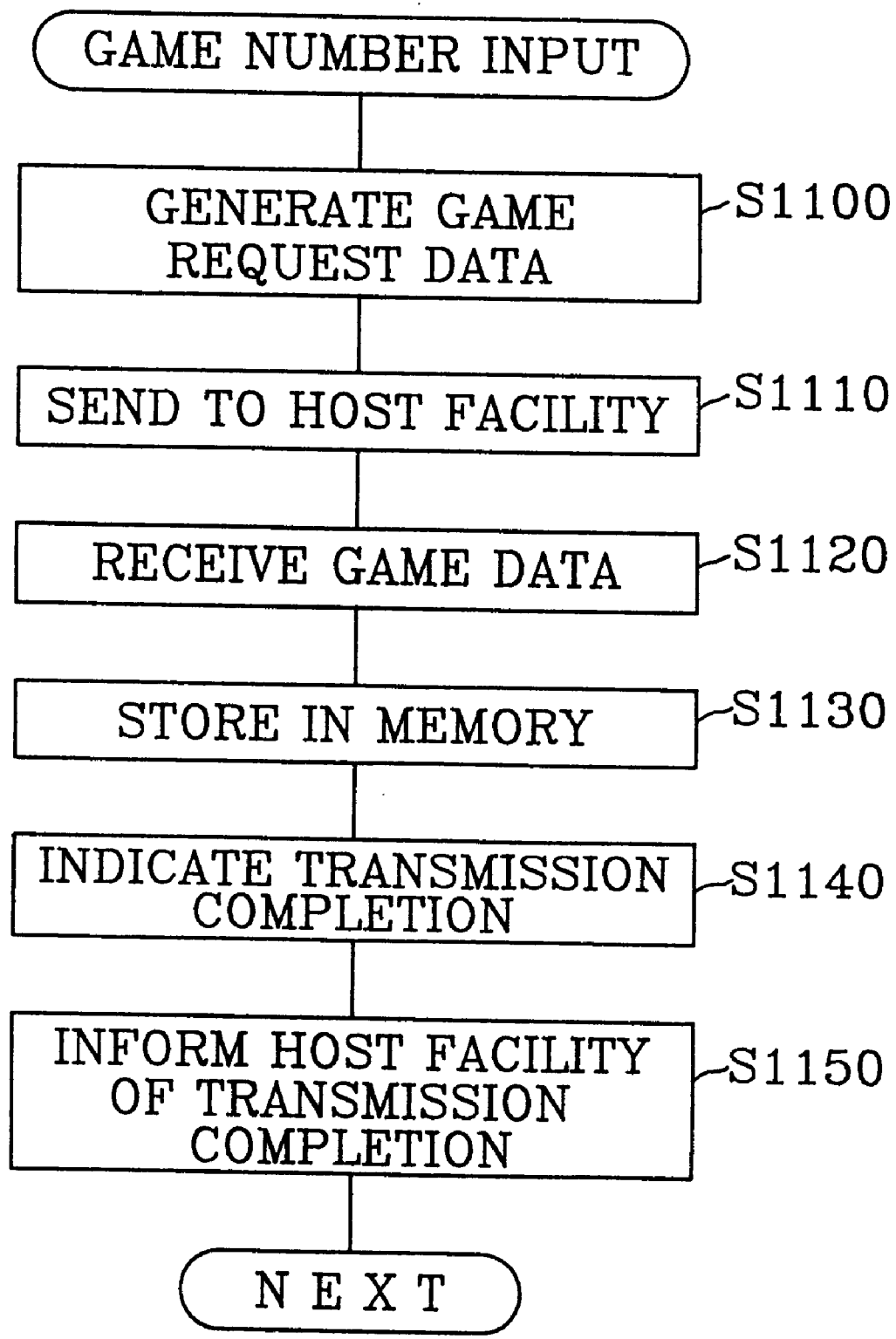
FIG. 6 is a flowchart of the process to be effected when playing a game is requested at the communication terminal device.

The above procedure is further explained in detail, only for exemplification purpose, hereinafter referring to FIGS. 4, 5, and 6.

When "game" category is selected at step S1000, operation selection page shown in FIG. 4 is displayed, with an instruction 301 and operation list 303 shown on the screen. The operation list has three items of item A, item B and item C. Item A has a first game number box 305, into which the operator can directly input a game number representative of a specific game the operator desires to receive. Item B is the operation to display the list of the game numbers now available from the game data base 101 of the host facility 100. Item C is the operation to display charges, for example the accumulated cost for the month or the past month(s).

When the operator wishes to play a game, item A or B is selected. For example, if the operator knows the game number of the game he wishes to play, the operator moves the cursor on the screen to the first game number input box 305, and inputs the desired game number therein. If the operator does not know the game number, he selects item B.

When item B is selected, data in the form of the list of game numbers is sent from the host facility 100 and displayed on the screen. As shown in FIG. 5, the list displayed by selecting item B has an input part 311 and display part 313. The display of the game list 313 can be scrolled to display further the list of games. The display part 313 displays the number of players able to participate in the play and the charge, in addition to the game numbers and the game name. The operator, referring to these information on the screen, inputs his desired game number into a second game number input box 315 of the input part 311.

When selecting a game for the first time, the operator may wish to know the feature or outline of the game. In this case, the operator inputs the selected game number into an explanation box 317 of item Y of the input part 311. As a result, the outline of the game is explained on the display part 313.

The game list can be printed out such that the operator can refer to the printed game list when he selects a game on other occasions. For printing, item Z of "print" in the input part 311 is selected. In response, the game list is printed, via the data input/output connector 27 and data output cable 37 shown in FIG. 1, at the printer 40. The process which is effected when a game number is input in the first game number box 305 of item A shown in FIG. 4 or in the second game number box 315 of item X shown in FIG. 5 will be now explained referring to FIG. 6.

First, game request data is generated at step S1100. The game request data includes the identification number of the calling personal communicator 1 and the desired game number. The generated game request data is then sent out to the host facility 100 at step S1110.

At the host facility 100, the received request data is input by the control unit 120 through the headend 130. Subsequently, game data corresponding to the request is retrieved from the game data base 101 by the game data transmitter 111. The retrieved game data is sent out via the headend 130 to the transmission paths 200 and to the corresponding personal communicator 1. First, second, and third predetermined time periods, which will be described later in detail, are also sent out to the personal communicator 1.

Turning back to FIG. 6, the game data is received at the personal communicator 1 at step S1120 and stored in the memory 8 at step S1130. When the storage of the game data into the memory 8 is completed, the completion is indicated on the monitor 16 at step S1140. Further, data indicative of the completion of the game data transmission is sent out to the host facility 100 at step S1150 as the last step of the instant process step, and the personal communicator 1 awaits the next operation. When, for example, game play is instructed as the next operation, the game stored in the memory 8 is started.

Figure 7:
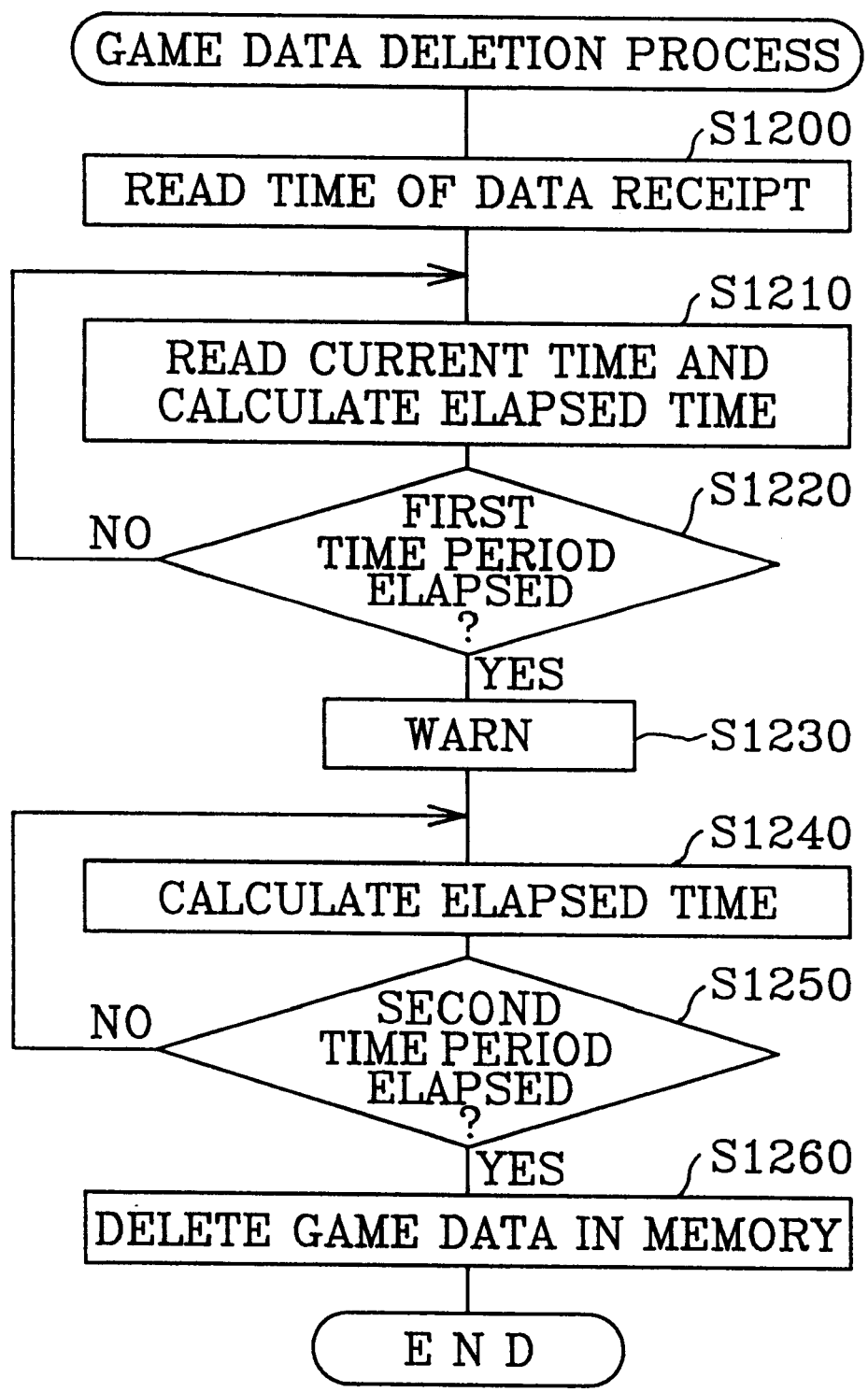
FIG. 7 is a flowchart of the process to effect deletion of the game data.

The game data received by the process shown in FIG. 6 and the game data stored in the memory 8 is automatically deleted, as shown in the flowchart of FIG. 7, in the following manner. First, the time when the data receipt is completed is read out at step S1200. The current time is also read out and the time period which has elapsed after the completion of the data receipt is calculated at step S1210. Next, it is determined, at step S1220, whether or not a first predetermined time period has elapsed. If "NO" is determined at the step S1220, the flow goes back to the step S1210. Thus, when the first predetermined time period has elapsed, a warning is given at step S1230. Further elapsing time period is calculated at step S1240. When it is determined, at step S1250, that a second predetermined time period has elapsed, the game data stored in the memory 8 is deleted at step S1260, and the instant process ends.

The warning given at step S1230 may be a various form of warning, such as a message reading "Time Out in Five Minutes!" on the monitor 16, or an alarming sound. Therefore, the total of the first predetermined time period of the step S1220 and the second predetermined time period of the step S1250 is the useful life period of the received game data. The warning may be provided a plurality of times, such as five minutes, two minutes and one minute before the deletion of the game data. Warned by this warning, the player can print the current status of the game progress, for example, which player corresponds to which character in the game or the top scorer at the time, at the printer 40 before quitting the game play. The printed data is useful when the player resumes the game play.

Furthermore, when the host facility 100 receives the data indicative of the transmission completion at the step S1150, the host facility 100 performs the charging process to accumulate the cost for its data transmission service. There are two known cost charging systems. One is the fixed amount system and the other is the pay-per-play system. In the fixed amount system, the fixed cost amount per-time period, for example monthly, is predetermined. In the pay-per-play system, the cost is charged per each play.

The charging system is dependent on the form or condition of the communication service to be rendered. In a practical charging system, the cost would be varied with respect to the complicatedness or scale of the game data provided. The cost would also vary depending on whether the game is new or old in the market. In the present embodiment, the pay-per-play system is adopted and the cost for the data service to each terminal communicator is charged every time the data indicative of the transmission completion is sent from the personal communicator 1 at step S1150. The payment would be made, using the automatic transfer system, by debiting the amount to the bank account of the players.

However, the pay-per-play system has a problem: the player cannot know the total amount of the accumulated cost before actual payment. If the payment is made using the automatic transfer system, the player may not even notice his considerable expenditure on the game play. This problem is solved by the arrangement shown in FIG. 4. If the player selects item C of the operation list 303, the present accumulated cost and the previous cost, such as the payment made previously or the cost accumulated in the past half or whole year, are shown on the screen. Thus, parents can know the accumulated cost of their child's video game play.

By utilizing the communication system, the player need not purchase a game cassette or other software for playing video games, since the game data is provided by the host facility which received the game data request sent by the player from his personal communicator 1. Further, the game data provided to the player is temporarily stored in the memory 8 serving as temporary storage means of the personal communicator 1, thereby releasing the host facility to serve other personal communicators 1 requesting game data. The host facility is thus enabled to respond to a greater number of callers having personal communicators 1.

Furthermore, the game data stored in the memory 8 is deleted in a predetermined time period after it was received at the personal communicator 1. In other words, the useful life of the game data at the personal communicator 1 is limited. As a result of this arrangement, in order to continue the game play at the end of the predetermined time period, the player again needs to request the game data from the host facility 100. This arrangement is therefore prerequisite so long as the game data transmission service is not free of charge. In contrast, if it were possible to keep the game data at the communication terminal device at the end of game play, the player could play the game permanently without calling the host facility 100. Consequently, the service cost per each transmission would be higher than the normal price of the game cassettes. The above described arrangement solves this problem and meets the need of the software distributors.

The arrangement is also beneficial to the players since the service cost per each transmission can be considerably lower than the price of each game cassette. Therefore, the player who conventionally has to buy an expensive game cassette, even if he plays the game only once, can be satisfied with the reasonable cost of the transmission.

The arrangement is also superior with respect to child discipline. Video game players are in most cases younger children, who often become too absorbed in playing video games to quit in the middle thereof. The above arrangement according to the present invention leaves these children no other choice but to quit the play when a predetermined time period has elapsed. Thus, the arrangement meets the rising demand of parents.

The above embodiment is explained on the premise that the game is played by a single player using only a single personal communicator 1. However, a plurality of players in remote places can play the same game together.

For example, the transmission paths 200 or telecommunication lines is utilized to connect a plurality of personal communicators 1 to one another such that the interactive communication can be performed therebetween. When the plurality of personal communicators 1 are supplied with the same game data, the players have the same game characters in common. Therefore, the data to be transmitted among the plurality of personal communicators 1 are only character number data and the position data. Thus, the players together participate, on a real time basis, in the same game on the monitor 16 of respective personal communicators 1.

Map data of a role-playing game may be divided according to the progress degree of the story and the divided map data be sold separately. When the game progresses and the player wishes to play on a more advanced map data, the player purchases and downloads the advanced map data. In this case, arrangement is provided such that the player cannot purchase the advanced map data until the "capacity" or the progress degree of the characters in the game reaches a predetermined degree or level. Accordingly, using the interactive communication system, the player is to ask the host facility 100 for the proof of the capacity. In response, data proving the capacity or level of the characters may be transmitted from the host facility 100. The capacity proof sent from the host facility 100 would be printed out by the printer 40 or transmitted to the player's facsimile machine, as a certificate.

It will be now explained how the communication system of the present invention is adopted to karaoke. The procedure to communicate the karaoke data is basically similar to the above described procedure to communicate the game data. Therefore, the explanation of the similar portion of the procedure are omitted for simplification. When using the system for karaoke, the microphone 33 is connected to the microphone connector 23 of the personal communicator 1.

When "karaoke" is selected on the category selection page at step S1000, an operation selection page similar to that of FIG. 4 is displayed on the screen. Specifically, an item A of a desired karaoke number, item B of the karaoke number list, and item C of charge are displayed. If the operator wishes to start karaoke, the operator inputs the desired karaoke number in the corresponding box at item A or B.

Karaoke request data is then generated at the personal communicator 1 and sent out to the host facility 100. The host facility 100, receiving the request, controls the karaoke data transmitter 113 to retrieve corresponding karaoke data from the karaoke data base 103, and sends out the retrieved karaoke data to the personal communicator 1.

The karaoke data received at the personal communicator 1 is stored, as song data, in the memory 8 via the modulator/demodulator 3a. At the same time, the CPU 5 sends song selection data, which is predetermined according to the type of each song, to the video tuner 3b in order to select visual data suitable to the selected song. Further, the CPU 5 synchronously outputs to the video image circuit 9 and the sound source 10, respectively, words data and accompaniment data included in the song data stored in the memory 8. The video image circuit 9 converts the information concerning the words and other elements of the song into word/image data and outputs the word/image data to the monitor 16.

The sound source 10 converts the accompaniment data into audio signals, and outputs the audio signals to the audio amplifier 11. Subsequently, the audio amplifier 11 synthesizes the audio signals and the voice signals sent from the microphone 12, amplifies these synthesized signals and outputs them to the speaker 13 as sound signals. The video tuner 3b reads out background visual data selected according to the song selection data, and outputs to the image composite circuit 15. Then, the image composite circuit 15 synthesizes the background visual data and the words/image data and outputs the video signals to the monitor 16.

The procedure for playing karaoke music will be further explained in detail.

The song data sent out from the host facility 100 via the co-axial cables as transmission paths 200 includes multiplied RF signals of video information and RF signals converted from the song data. The CPU 5 of the personal communicator 1 sends the song selection data to the video tuner 3b of the terminal modem 3 in order to select the video channel according to the received song data. The song selection data is predetermined according to the genre of songs. Consequently, the song data is sent to the sound source 10 and the karaoke music is played.

When the karaoke music is ended, data indicative of the end of the play is sent to the host facility 100. In response, the host facility 100 performs the charging process. In contrast to the pay-per-play system of the game data service, the cost for providing the karaoke music may be charged, for example per hour, since a single piece of karaoke music is only several minutes long.

In the case of karaoke data, as in the case of game data, a predetermined time is counted after the karaoke data is received from the host facility, and when the predetermined time has elapsed, the karaoke data is deleted.

By utilizing the communication system, the karaoke singer need not purchase a video disk or other karaoke software, since the karaoke data is provided by the host facility 100, which received the karaoke data request sent by the karaoke singer from his personal communicator 1. Further, the karaoke data provided to the karaoke singer is temporarily stored in the memory 8 serving as temporary storage means for the personal communicator 1, thereby releasing the host facility 100 to serve other personal communicators 1 requesting karaoke data. The host facility 100 is thus able to respond to a greater number of callers having personal communicators 1. This invention has been described above with reference to the preferred embodiment as shown in the drawings. Modifications and alterations may become apparent to one who skilled in the art upon reading and understanding the specification. Despite the use of the embodiment for illustration purposes, it is intended to include all such modifications and alterations within the scope and spirit of the appended claims.

In this spirit, it should also be noted that in the embodiment, the personal communicator 1 is integrally provided with the monitor 16 and the speaker 13. However, any other external monitor or speaker may be connected to the personal communicator 1 and utilized. For example, a television receiver may be connected to the personal communicator 1, thereby outputting the video information and the audio information on the television receiver. In this case, the personal communicator 1 may be provided with a small display, on which the selection pages as those shown in FIGS. 4 and 5 would be displayed.

Furthermore, the transmission paths 200 may be existing co-axial cables for cable television system, thereby structuring the communication system of the present invention as a multimedia interactive communication system. In this way, the video and audio information of satellite television services, video disks, radio programs, and other various forms of available software are equated to the other data base shown in FIG. 2. Such personal communicators 1 of the present invention can be provided in each individual's home or hotel room and in other various situations and places.

As mentioned, the stored data is deleted in a predetermined time period after it was received. This arrangement is beneficial to the data distributors since repeated game or karaoke play using the same game data or karaoke data is prevented.

Figure 8A:
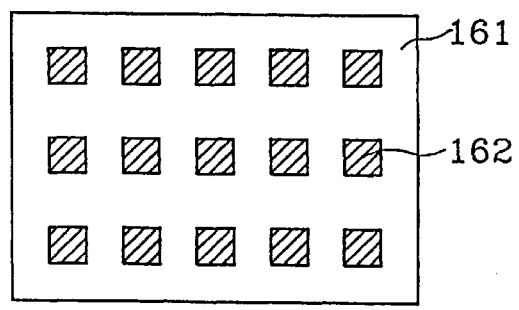
FIGS. 8A through 8D are illustrations showing various forms of modified interference means which interfere with the progress of a game.

In the above described embodiment, the game data stored in the memory 8 is deleted in order to interfere with the progress of game. Alternative arrangements to this are provided by the present invention, as shown in FIGS. 8A through 8D. In the arrangement of FIG. 8A, the view on a screen 161 of the monitor 16 is blocked with patterns of stripes 162 displayed thereon. Instead, the view displayed on the screen may be partly deleted. In the arrangement shown in FIG. 8B, only an opponent of a boxing game, who is to be displayed on an area 163 of the screen 161, is deleted. Still another alternative is provision of a switch 131 shown in FIG. 8C for a speaker circuit, which, when turned off, withholds the sound that would otherwise be issued from the speaker 13 during the game. Further alternative is provision of a switch 61 shown in FIG. 8D which invalidates the operation on the input device 6 or the controller 31. The switches 131 and 61 may be mechanical components or may be software operations. For instance, actuation of the sound source 10 may be halted by the CPU 5, or the CPU 5 may reject signals from the input device 6 or the controller 31. As still another alternative, the power of the personal communicator may be turned off when the CPU 5 determines that a predetermined time has elapsed after the game data was received.

Figure 9:
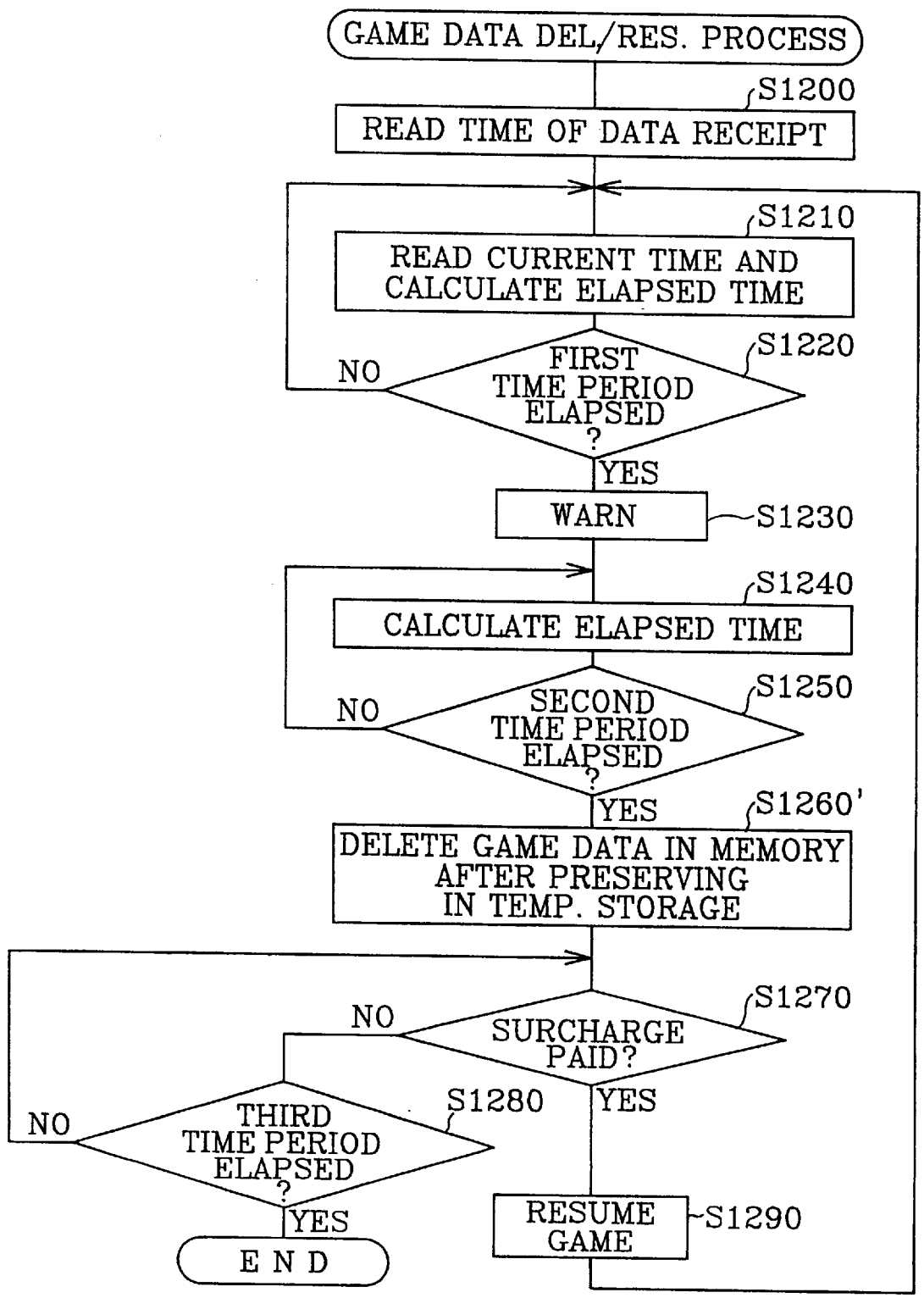
FIG. 9 is a flowchart of the game data deletion/restoration process.

In the described embodiment, when a predetermined time has passed after the game data was received from the host facility 100, the game data stored in the memory 8 is deleted. However, it may be arranged so that the player can resume playing the game by paying a surcharge. Specifically, the process steps shown in FIG. 9 may be taken. As will be noted, the process steps S1200 through S1250 in FIG. 9 are identical to those in FIG. 7, whereas at step S1260' the deletion of the game data is effected only after it is stored in a temporary storage device, different from the process at step S1260. At next step S1270, it is determined whether or not a surcharge has been paid. If the answer to the step S1270 is negative, it is next determined, at step S1280, whether or not a predetermined time has elapsed after the game data in the memory 8 was deleted. If the answer to the step S1280 is negative, the flow returns to step S1270. If the answer to the step S1280 is affirmative, the process step ends.

If "YES" is determined at the step S1270, the game data stored in the temporary storage device is restored into the memory 8 to permit resumption of game play, at step S1290. The flow then goes back to step S1210. In the process after the resumption of game play, the elapsed time after the time of paying the surcharge is calculated at step 1210.

The arrangement shown in FIG. 9 allows a player to continue playing a game as long as the player pays a surcharge. An instruction to pay the surcharge can be given through the keys on the input device 6. In response, the host facility 100 effects the charging process against the player.

Figure 10:
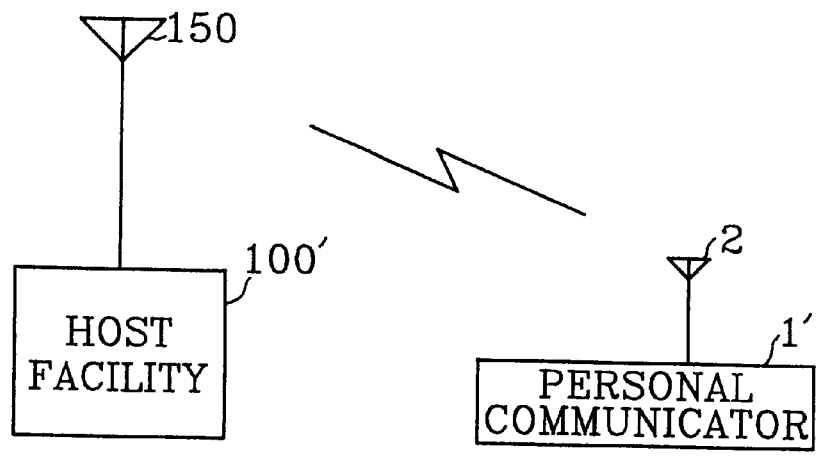
FIG. 10 is a block diagram schematically showing the system consisting of a host facility and the communication terminal device for receiving the game data from the host facility via wireless transmission.

In the embodiment shown in FIGS. 1 and 2, game data and karaoke data are transmitted via communication lines, which may be public telephone lines, dedicated communication lines, cables for community antenna television system. Instead of such communication lines, as shown in FIG. 10, the data may be sent via wireless transmission from a host facility 100' to a personal communicator 1'. In this case, the host facility 100' is provided with a not-shown wireless transmission circuit including a transmitting/receiving antenna 150, and the personal communicator 1' is provided with a not-shown transmitter/receiver circuit including a transmitting/receiving antenna 2.

Figure 11:
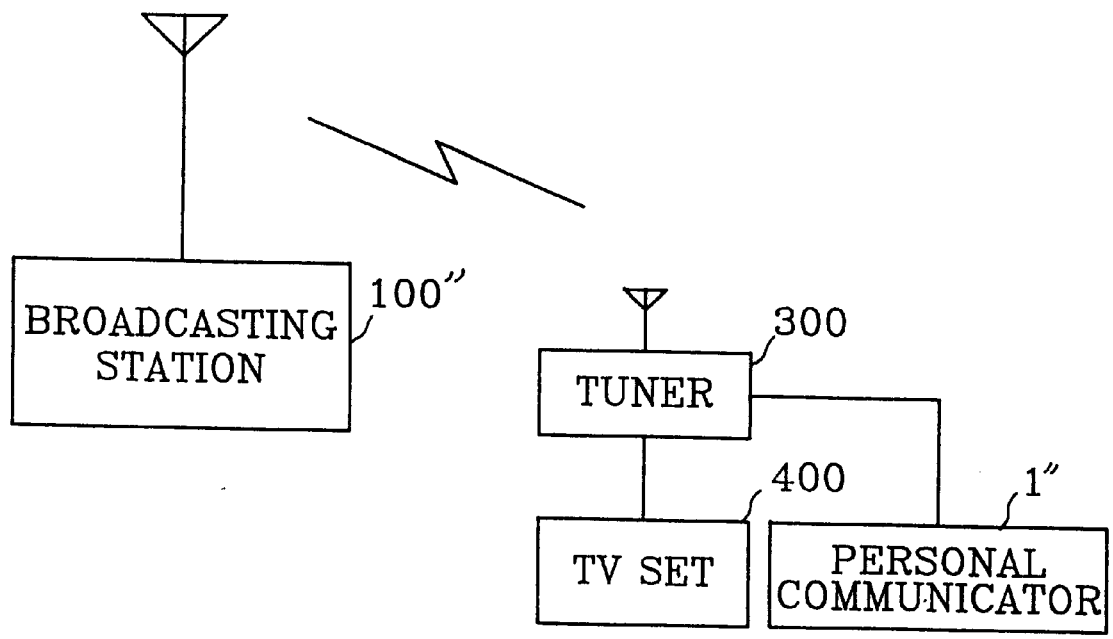
FIG. 11 is a block diagram schematically showing the system consisting of a broadcasting station and the communication terminal device for receiving the game data from the broadcasting station.

Turning to FIG. 11, a further modification is proposed in which the game data is sent from a ground broadcasting station 100" or a satellite broadcasting station. The game data, as it is received, is stored in the memory 8 of the personal communicator 1". In this case, the personal communicator 1" is connected with a tuner 300 so that the game is displayed on a screen of a home TV set 400. Alternatively, the broadcasting may be performed preferably via two-way communication through cables, or via Internet. In the communication system disclosed in this specification, the data to be transmitted may be either analog or digital.

In both modifications shown in FIGS. 10 and 11, the game play is interrupted when a predetermined time has elapsed after the game data was received at the personal communicators 1', 1". Of course, the arrangement shown in FIG. 9 may be incorporated into these arrangements of FIGS. 10 and 11 to allow the player to continue playing a game by paying a surcharge.

Figure 12:
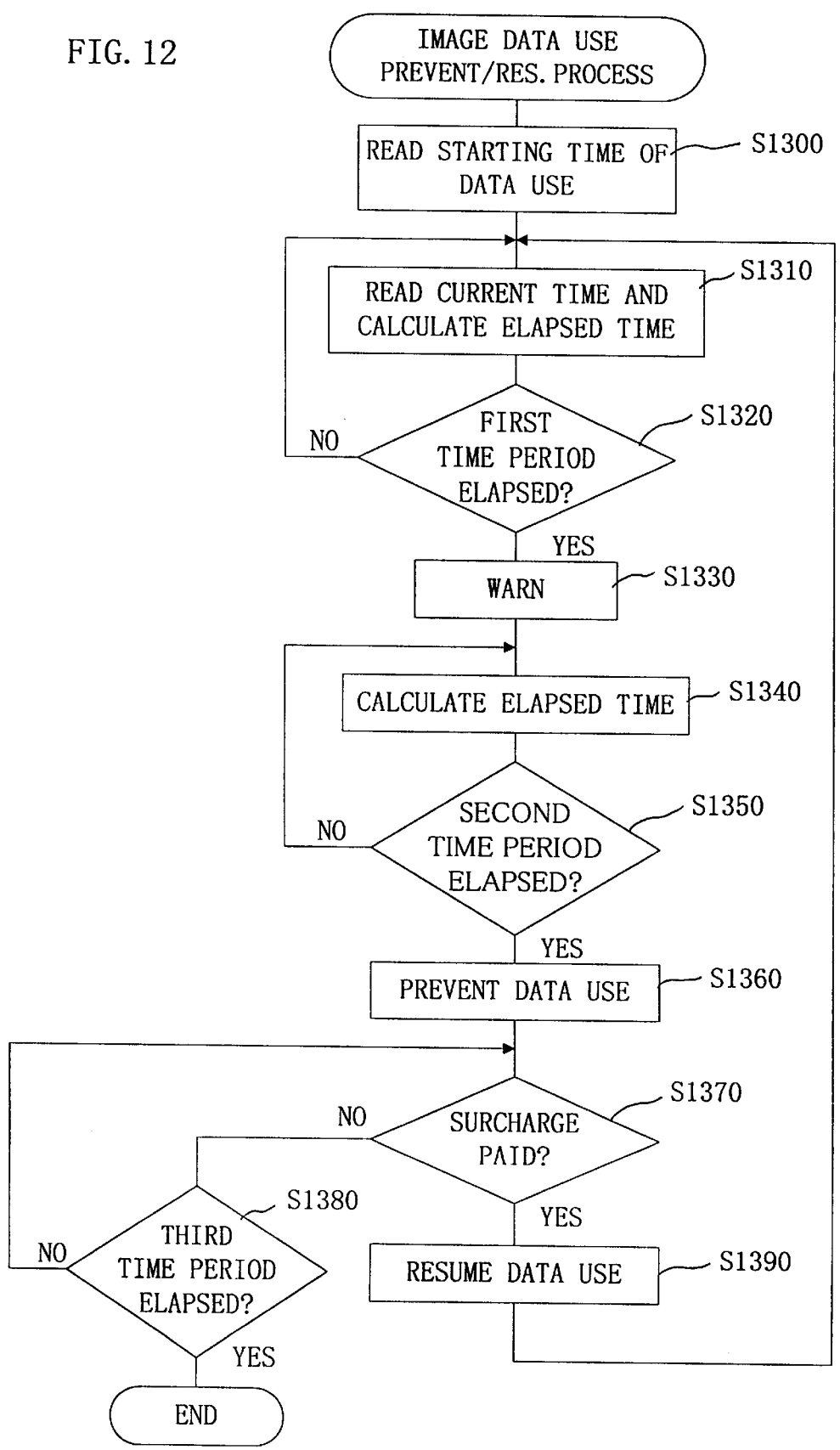
FIG. 12 is a flowchart showing another embodiment.

FIG. 12 is a flowchart showing another embodiment. In this embodiment, a predetermined time period to prevent further use of the image data is counted from the starting time of use of the data, not from the receiving time of the data from the host facility.

Figure 8B:
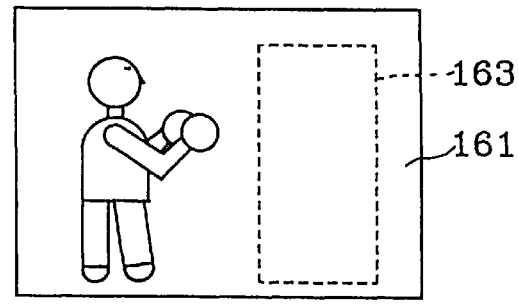
Figure 8C:
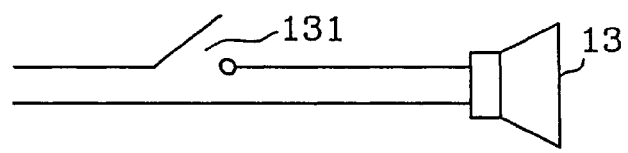
Figure 8D:
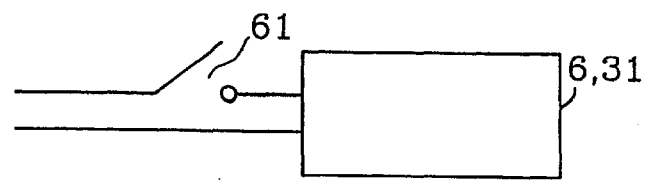

This embodiment is explained in detail hereinafter referring to FIG. 12. When the use of the image data sent from the host facility starts, the starting time is read out at step S1300. The current time is also read out, and the elapsed time after the starting time is calculated at step S1310. Then it is determined, at step S1320, whether or not a first predetermined time period has elapsed. If "NO" is determined at step S1320, the flow returns to step S1310. If "YES" is determined, a warning is given at step S1330, and the elapsed time continues to be calculated at step S1340 until the end of a second predetermined time period. When it is determined, at step S1350, that the second predetermined time period has elapsed, a process to prevent further use of the above image data is performed at step S1360. There may be various means to prevent further use of the image data, such as deleting the image data stored in the memory 8, blocking, as shown in FIG. 8A or 8B, the view on the screen of the monitor 16 in accordance with the progress of the image data processing, stopping, as shown in FIG. 8C, the sound generated in accordance with the progress of the image data processing and invalidating, as shown in FIG. 8D, any operation of the input device 6 or the controller 31 for instruction.

At next step S1370, it is determined whether or not a surcharge is paid. If the answer to step S1370 is negative, it is next determined, at step S1380, whether or not a third predetermined time has elapsed after the process to prevent further use of the image data is performed. If the answer to step S1380 is negative, the flow returns to step S1370. If the answer to step S1380 is affirmative, the process step ends.

If "YES" is determined at step S1370, the image data is permitted to be continuously used at step S1390, then the flow returns to step S1310. In the process after the resumption of use, the elapsed time after the payment of the surcharge is calculated at step S1310. In the case where deletion of the image data stored in the memory is used as a means of preventing further use of the image data, it is preferable to preserve the image data in a not-shown temporary storage device before deleting it from the memory, and to restore it from the temporary storage device into the memory after the surcharge is paid.

As in the above embodiment, instructions to pay the surcharge can be given by operating the keyboard of the communicator 1, and in response to the key operation, the host facility 100 performs the charging process.

Figure 13:
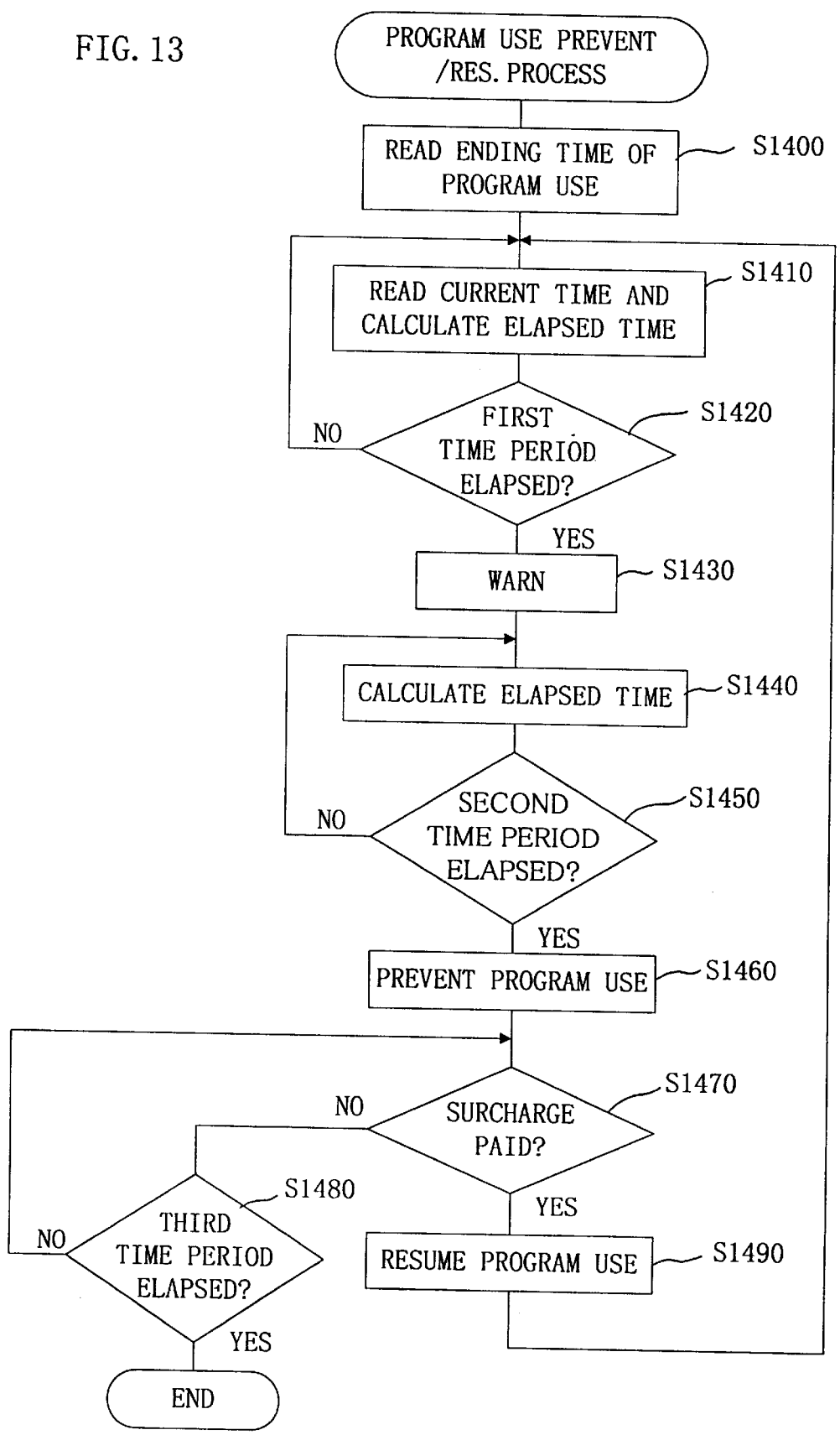
FIG. 13 is a flowchart showing a further embodiment.

FIG. 13 is a flowchart of a further embodiment. In this embodiment, when the program sent from the host facility is continuously unused for a predetermined time period, a process to prevent further use of the program is performed.

The procedure of this embodiment is explained in detail, hereinafter referring to FIG. 13. When the program sent from the host facility is used for some time and then the use ends, the ending time is read out at step S1400. Next, the current time is also read out and the elapsed time after the ending time is calculated at step S1410. Then it is determined, at step S1420, whether or not a first predetermined time period has elapsed. If "NO" is determined at step S1420, the flow returns to step S1410. If "YES" is determined, a warning is given at step S1430, and the elapsed time continues to be calculated at step S1440 until the end of a second predetermined time period. When it is determined, at step S1450, that the second predetermined time period has elapsed, a process to prevent further use of the above program is performed at step S1460. There may be various means to prevent further use of the program, such as deleting the program stored in the memory 8, blocking, as shown in FIG. 8A or 8B, the view on the screen of the monitor 16 in accordance with the progress of the program, stopping, as shown in FIG. 8C, the sound generated in accordance with the progress of the program, and invalidating, as shown in FIG. 8D, any operation of the input device 6 or the controller 31 for instructions.

At next step S1470, it is determined whether or not a surcharge is paid. If the answer to step S1470 is negative, it is next determined, at step S1480, whether or not a third predetermined time has elapsed after the process to prevent further use of the program is performed. If the answer to step S1480 is negative, the flow returns to step S1470. If the answer to step S1480 is affirmative, the process step ends.

If "YES" is determined at step S1470, the program is permitted to be continuously used at step S1490, then the flow returns to step S1410. In the process after the resumption of use, the elapsed time after the payment of the surcharge is calculated at step S1410. In the case where deletion of the program stored in the memory is used as a means of preventing further use of the program, it is preferable to preserve the program in a not-shown temporary storage device before deleting it from the memory, and to restore it from the temporary storage device into the memory after the surcharge is paid.

As in the above embodiment, instructions to pay the surcharge can be given by operating the keyboard of the communicator 1, and in response to the key operation, the host facility 100 performs the charging process.

If the program is used while a process shown in FIG. 13 is in progress, the above process is ended by a not-shown interrupt handling, and at the next cycle time the process at step S1400 starts again.

In the embodiments shown in FIG.13, the elapsed time period, during which a program is continuously unused, is preferably counted in the background by a backup power source even when the power of the personal communicator 1 is off. The processes to give a warning and to prevent further use may be performed when the power switch of the personal communicator 1 is turned on next time.

Figure 14:
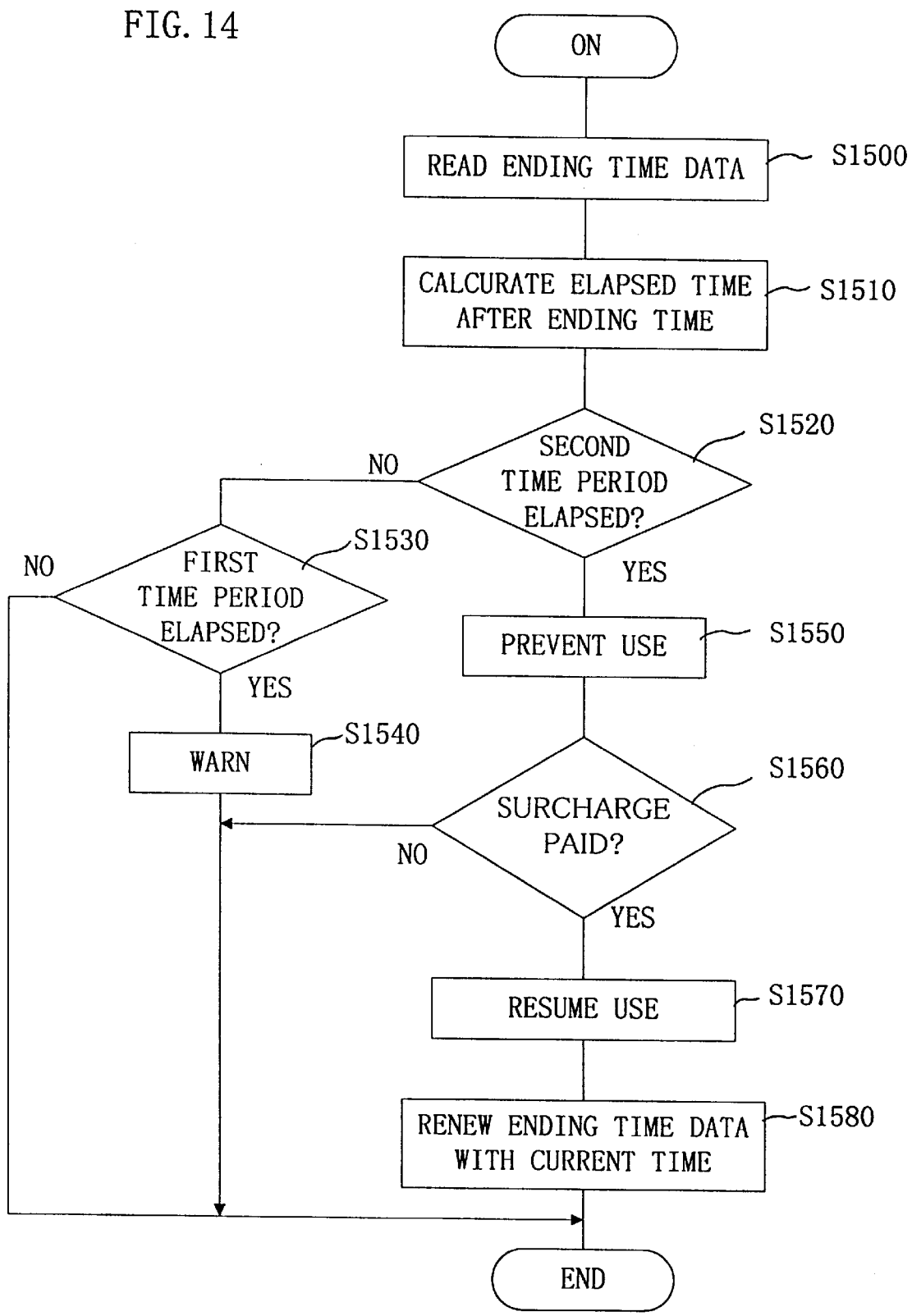
FIG. 14 is a flowchart showing a still further embodiment.

In addition to the above described case, it may be considered that the elapsed time is calculated each time the power switch of the personal communicator 1 is turned on. Such an embodiment is shown in FIG. 14. In this embodiment, concerning each program or data stored in the memory 8, the ending time of use of the program or the data is stored in a specific storage region of the memory 8. When the program or the data is used, the ending time data is renewed at the time of end of use. The procedure is explained hereinafter with respect to the case where a program is received by a personal communicator. In the case where image data, game data, or karaoke data is received, the same procedure is also taken.

In FIG. 14, when the power switch of the personal communicator 1 is turned on, the ending time data concerning every stored program is read out, at step S1500, from the above specific storage region of the memory 8. Next, at step S1510, the elapsed time after the ending time is calculated. It is next determined, at step S1520, whether or not the elapsed time has exceeded a predetermined time period to prevent further use of the program, and at step S1530, whether or not the elapsed time has exceeded another predetermined time period to give a warning. If the elapsed time has exceeded the predetermined time period (a first time period) to give a warning (the answer to step S1530: "YES"), a warning is given at step S1540. If the elapsed time has exceeded the predetermined time period (a second time period) to prevent further use of the program (the answer to step S1520: YES), the process to prevent further use of the program is performed at step S1550. If the elapsed time has not exceeded either of the above predetermined time periods, the process step shown in FIG. 14 ends.

When the process to prevent further use is performed, it is determined, at step S1560, whether or not a surcharge has been paid within a predetermined time period (a third time period). If the answer to step S1560 is negative, the process step ends. If the answer to step S1560 is affirmative, the process to allow resumption of use of the program is performed at step S1570. Next, the process to renew the ending time data with the current time concerning the program is performed at step S1580, and then the process step ends.

As in the above embodiment, instructions to pay the surcharge can be given by operating the keyboard of the communicator 1, and in response to the key operation, the host facility 100 performs the charging process.

In order to enable the choice between two modes, one of which is to calculate the elapsed time when the power switch of the personal communicator 1 is turned on as shown in FIG. 14, and the other of which is to calculate the elapsed time in the background as shown in FIG. 13, the input device 6 or the controller 25 of the personal communicator 1 may be used by the user for choosing.

Wherefore, having described the present invention, what is claimed is:

1. A communication system for transmitting at least one of the program, the data, and a combination of the program and data from a host facility to a communication terminal device, said communication terminal device comprising:

an input device for inputting instructions to execute the program or to process the data, receiving means for receiving one of the program, the data, and a combination of the program and data as sent out from said host facility, storage means for storing the program, the data, or a combination of the program and data received by said receiving means, executing means for executing the program stored in said storage means or executing data processing by using the data stored in said storage means, in accordance with instructions from said input device, clock means for keeping a predetermined time period after said receiving means receives the transmission, and interference means for interfering with execution of said executing means when said clock means counts said predetermined time period; and said host facility comprising:

storage means for storing at least one of the program, the data, and a combination of the program and data together with the duration data indicative of the predetermined time period to be counted by said clock means, and sending out means for sending out at least one of the program, the data, and a combination of the program and data together with the duration data stored in said storage means to said communication terminal device.

2. The communication system according to claim 1, said communication terminal device further comprising:

second clock means for keeping a second predetermined time period shorter than said predetermined time period counted by said clock means, and alarm means for issuing an alarm when said second clock means counts said second predetermined time period, and thereby informing that interference by said interference means with execution of said executing means will soon be performed.

3. The communication terminal device according to claim 2, further comprising:

third clock means for keeping a third predetermined time period after said interference means interferes with execution of said executing means, interference stop instruction means for instructing to stop the interference performed by said interference means, and means for stopping the interference performed by said interference means and thereby allowing resumption of execution of the program or data processing performed by said executing means when said interference stop instruction means receives the instruction before said third clock means counts said third predetermined time period.

4. The communication system according to claim 1, wherein said interference means comprises means for deleting at least one of the program, the data, and a combination of the program and data stored in said storage means.

5. The communication system according to claim 1, wherein said communication terminal device comprises display means having a screen on which the progress of execution of the program or data processing is displayed, and said interference means comprises means for blocking the view of what is displayed on said screen.

6. The communication system according to claim 1, wherein said interference means comprises means for invalidating the operation of said input device.

7. The communication system according to claim 1, further comprising sound generating means for generating a predetermined sound in accordance with the progress of execution of the program or data processing, wherein said interference means comprises means for preventing said sound generating means from generating the sound.

8. A communication system for transmitting at least one of the program, the data, and a combination of the program and data from a host facility to a communication terminal device, said communication terminal device comprising:

an input device for inputting instructions to execute the program or to process the data, receiving means for receiving one of the program, the data, and a combination of the program and data as sent out from said host facility, storage means for storing the program, the data, or a combination of the program and data received by said receiving means, executing means for executing the program stored in said storage means or executing data processing by using the data stored in said storage means, in accordance with instructions from said input device, clock means for keeping a predetermined time period after said executing means starts execution of the program or data processing, and interference means for interfering with execution of said executing means when said clock means counts said predetermined time period; and said host facility comprising:

storage means for storing at least one of the program, the data, and a combination of the program and data together with the duration data indicative of the predetermined time period to be counted by said clock means, and sending out means for sending out at least one of the program, the data, and a combination of the program and data together with the duration data stored in said storage means to said communication terminal device.

9. The communication system according to claim 8, said communication terminal device further comprising:

second clock means for keeping a second predetermined time period shorter than said predetermined time period counted by said clock means, and alarm means for issuing an alarm when said second clock means counts said second predetermined time period, and thereby informing that interference by said interference means with execution of said executing means will soon be performed.

10. The communication terminal device according to claim 9, further comprising:

third clock means for keeping a third predetermined time period after said interference means interferes with execution of said executing means, interference stop instruction means for instructing to stop the interference performed by said interference means, and means for stopping the interference performed by said interference means and thereby allowing resumption of execution of the program or data processing performed by said executing means when said interference stop instruction means receives the instruction before said third clock means counts said third predetermined time period.

11. The communication system according to claim 8, wherein said interference means comprises means for deleting at least one of the program, the data, and a combination of the program and data stored in said storage means.

12. The communication system according to claim 8, wherein said communication terminal device comprises display means having a screen on which the progress of execution of program or data processing is displayed, said interference means comprises means for blocking the view of what is displayed on said screen.

13. The communication system according to claim 8, wherein said interference means comprises means for invalidating the operation of said input device.

14. The communication system according to claim 8, further comprising sound generating means for generating a predetermined sound in accordance with the progress of execution of the program or data processing, wherein said interference means comprises means for preventing said sound generating means from generating the sound.

15. A communication system for transmitting at least one of the program, the data, and a combination of the program and data from a host facility to a communication terminal device, said communication terminal device comprising:

an input device for inputting instructions to execute the program or to process the data, receiving means for receiving one of the program, the data, and a combination of the program and data as sent out from said host facility, storage means for storing the program, the data, or a combination of the program and data received by said receiving means, executing means for executing the program stored in said storage means or executing data processing by using the data stored in said storage means, in accordance with instructions from said input device, clock means for keeping a predetermined time period after said execution means ends the execution of the program or data processing to count a time period during which at least one of the program, the data, and a combination of the program and data is continuously unused, and interference means for interfering with execution of said executing means when said clock means counts a predetermined time period; and said host facility comprising:

storage means for storing at least one of the program, the data, and a combination of the program and data together with duration data indicative of the predetermined time period to be counted by said clock means, and sending out means for sending out at least one of the program, the data, and a combination of the program and data together with the duration data stored in said storage means to said communication terminal device.

16. The communication system according to claim 15, said communication terminal device further comprising:

second clock means for keeping a second predetermined time period shorter than said predetermined time period counted by said clock means, and alarm means for issuing an alarm when said second clock means counts said second predetermined time period, and thereby informing that interference by said interference means with execution of said executing means will soon be performed.

17. The communication terminal device according to claim 16, further comprising:

third clock means for keeping a third predetermined time period after said interference means interferes with execution of said executing means, interference stop instruction means for instructing to stop the interference performed by said interference means, and means for stopping the interference performed by said interference means and thereby allowing resumption of execution of the program or data processing performed by said executing means when said interference stop instruction means receives the instruction before said third clock means counts said third predetermined time period.

18. The communication system according to claim 15, wherein said interference means comprises means for deleting at least one of the program, the data, and a combination of the program and data stored in said storage means.

19. The communication system according to claim 15, wherein said communication terminal device comprises display means having a screen on which the progress of execution of program or data processing is displayed, said interference means comprises means for blocking the view of what is displayed on said screen.

20. The communication system according to claim 15, wherein said interference means comprises means for invalidating the operation of said input device.

21. The communication system according to claim 15, further comprising sound generating means for generating a predetermined sound in accordance with the progress of execution of the program or data processing, wherein said interference means comprises means for preventing said sound generating means from generating the sound.

* * * * *

UNITED STATES PATENT AND TRADEMARK OFFICE
CERTIFICATE OF CORRECTION

| | |
|---|---|
| PATENT NO. | : 6,193,520 B1 |
| APPLICATION NO. | : 09/109784 |
| DATED | : February 21, 2001 |
| INVENTOR(S) | : Takeya Okamoto |

It is certified that error appears in the above-identified patent and that said Letters Patent is hereby corrected as shown below:

Title Page (63)

On Front Page under Related U.S. Application Data delete "Continuation-in-part of application No. 08/642,560, filed on May 3, 1996, now Pat. No. 5,775,995." and insert --This application is a continuation-in-part of U.S. Application No. 08/642,560 filed on May 3, 1996, now U.S. Patent No. 5,775,995, which is a divisional of U.S. Application No. 08/555,400 filed on November 9, 1995, now U.S. Patent No. 5,735,744, which is a continuation-in-part of U.S. Application No. 08/232,862 filed on April 25, 1994, now U.S. Patent No. 5,489,103.--

Column 1, Lines 5 and 6, delete "This is a Continuation-in-Part of Application Ser. No. 08/642,560 filed May 3, 1996, now U.S. Pat. No. 5,775,995." and insert
--This application is a continuation-in-part of U.S. Application No. 08/642,560 filed on May 3, 1996, now U.S. Patent No. 5,775,995, which is a divisional of U.S. Application No. 08/555,400 filed on November 9, 1995, now U.S. Patent No. 5,735,744, which is a continuation-in-part of U.S. Application No. 08/232,862 filed on April 25, 1994, now U.S. Patent No. 5,489,103.--

Signed and Sealed this

Twenty-fifth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,193,520 B1 | Page 1 of 1 |
| APPLICATION NO. | : 09/109784 | |
| DATED | : February 27, 2001 | |
| INVENTOR(S) | : Takeya Okamoto | |

It is certified that error appears in the above-identified patent and that said Letters Patent is hereby corrected as shown below:

Title Page (63)

On Front Page under Related U.S. Application Data delete "Continuation-in-part of application No. 08/642,560, filed on May 3, 1996, now Pat. No. 5,775,995." and insert --This application is a continuation-in-part of U.S. Application No. 08/642,560 filed on May 3, 1996, now U.S. Patent No. 5,775,995, which is a divisional of U.S. Application No. 08/555,400 filed on November 9, 1995, now U.S. Patent No. 5,735,744, which is a continuation-in-part of U.S. Application No. 08/232,862 filed on April 25, 1994, now U.S. Patent No. 5,489,103.--

Column 1, Lines 5 and 6, delete "This is a Continuation-in-Part of Application Ser. No. 08/642,560 filed May 3, 1996, now U.S. Pat. No. 5,775,995." and insert
--This application is a continuation-in-part of U.S. Application No. 08/642,560 filed on May 3, 1996, now U.S. Patent No. 5,775,995, which is a divisional of U.S. Application No. 08/555,400 filed on November 9, 1995, now U.S. Patent No. 5,735,744, which is a continuation-in-part of U.S. Application No. 08/232,862 filed on April 25, 1994, now U.S. Patent No. 5,489,103.--

This certificate supersedes the Certificate of Correction issued March 25, 2008.

Signed and Sealed this

Fifteenth Day of April, 2008

JON W. DUDAS
*Director of the United States Patent and Trademark Office*

(12) EX PARTE REEXAMINATION CERTIFICATE (10228th)
United States Patent
Okamoto

(10) Number: US 6,193,520 C1
(45) Certificate Issued: *Jul. 23, 2014

(54) INTERACTIVE COMMUNICATION SYSTEM FOR COMMUNICATING VIDEO GAME AND KARAOKE SOFTWARE

(75) Inventor: Takeya Okamoto, Nagoya (JP)

(73) Assignee: ADC Technology Inc., Naka-Ku, Nagoya-Shi, Aichi (JP)

Reexamination Request:
No. 90/009,524, Aug. 17, 2009
No. 90/010,666, Sep. 4, 2009

Reexamination Certificate for:
Patent No.: 6,193,520
Issued: Feb. 27, 2001
Appl. No.: 09/109,784
Filed: Jul. 2, 1998

Certificate of Correction issued Mar. 25, 2008
Certificate of Correction issued Apr. 15, 2008

(*) Notice: This patent is subject to a terminal disclaimer.

Related U.S. Application Data

(60) Continuation-in-part of application No. 08/642,560, filed on May 3, 1996, now Pat. No. 5,775,995, which is a division of application No. 08/555,400, filed on Nov. 9, 1995, now Pat. No. 5,735,744, which is a continuation-in-part of application No. 08/232,862, filed on Apr. 25, 1994, now Pat. No. 5,489,103.

(30) Foreign Application Priority Data

May 10, 1993 (JP) .................................. 5-108303

(51) Int. Cl.
*A63F 13/12* (2006.01)
*G10H 1/36* (2006.01)

(52) U.S. Cl.
USPC ......... 434/307 A; 434/307 R; 434/40; 84/610

(58) Field of Classification Search
None
See application file for complete search history.

(56) References Cited

To view the complete listing of prior art documents cited during the proceedings for Reexamination Control Numbers 90/009,524 and 90/010,666, please refer to the USPTO's public Patent Application Information Retrieval (PAIR) system under the Display References tab.

*Primary Examiner* — William H Wood

(57) ABSTRACT

A communication system is proposed for transmitting at least one of the data, the program, and a combination of them from a host facility to a communicator such as a communication terminal device. In this communication system, the data or the program becomes unable to be used when a predetermined time has elapsed after it is transmitted from the host facility to the communicator. This communication system is provided with the function of giving a warning before the use of the transmission becomes unable and the function of resuming the use in accordance with the user's instruction even after the use becomes unable.

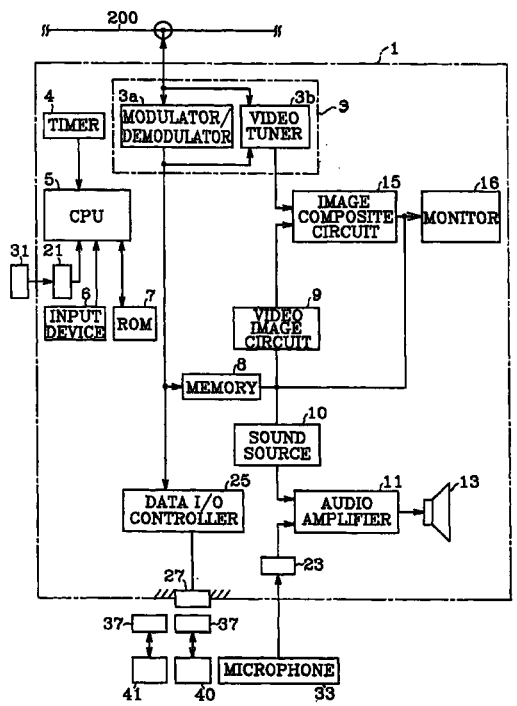

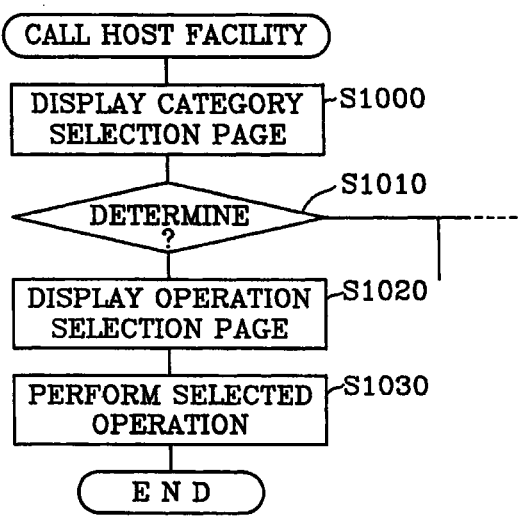

US 6,193,520 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8-14 is confirmed.

Claims 1-7 are cancelled.

Claims 15 and 20 are determined to be patentable as amended.

Claims 16-19 and 21, dependent on an amended claim, are determined to be patentable.

New claims 22-33 are added and determined to be patentable.

15. A communication system for transmitting at least one of the program, the data, and a combination of the program and data from a host facility to a communication terminal device, said communication terminal device comprising:
   an input device for inputting instructions to execute the program or to process the data,
   receiving means for receiving, *via wireless transmission,* one of the program, the data, and a combination of the program and data as sent out from said host facility,
   storage means for storing the program, the data, or a combination of the program and data received by said receiving means,
   executing means for executing the program stored in said storage means or executing data processing by using the data stored in said storage means, in accordance with instructions from said input device,
   clock means for keeping *and for initiating the measurement of* a predetermined time period after said execution means ends the execution of the program or data processing to count a time period during which at least one of the program, the data, and a combination of the program and data is continuously unused, and
   interference means for interfering with execution of said executing means when said clock means counts a predetermined time period *from the end of execution of the program or data processing*; and
   said host facility comprising:
      storage means for storing at least one of the program, the data, and a combination of the program and data together with duration data indicative of the predetermined time period to be counted by said clock means, and
      sending out means for sending out at least one of the program, the data, and a combination of the program and data together with the duration data stored in said storage means to said communication terminal device, *and
   wherein the communication terminal device is further configured to connect over telecommunication lines to at least another communication terminal device to facilitate real-time interactive communication between the at least two communication terminal devices regarding the program, the data, or the combination of program and data to support simultaneous interaction among a plurality of players executing the same program on the at least two communication terminal devices, each communication terminal device being associated with one of the plurality of players.*

20. The communication system according to claim 15, wherein said interference means comprises means for invalidating [the operation of] *an operation on* said input device.

22. *The communication system according to claim 12, wherein the program, the data, or the combination of program and data comprises either a video game, karaoke data, or multimedia audio/video data, and further wherein the first predetermined time period comprises a time period during which the program, data, or combination of program and data is usable without interference, and still further wherein the interference means is configured to cease blocking the view on the screen in response to a payment of an additional charge.*

23. *The communication system according to claim 22, wherein the communication terminal device is further configured to connect over telecommunication lines to at least another communication terminal device to facilitate real-time interactive communication between the at least two communication terminal devices regarding the software program to support simultaneous interaction among a plurality of players executing the same program on the at least two communication terminal devices, each communication terminal device being associated with one of the plurality of players.*

24. *The communication system according to claim 8, wherein the receiving means is configured for reception via wireless transmission.*

25. *The communication system according to claim 8, wherein the communication terminal device is further configured to connect over telecommunication lines to at least another communication terminal device to facilitate real-time interactive communication between the at least two communication terminal devices regarding the program, the data, or the combination of program and data to support simultaneous interaction among a plurality of players executing the same program on the at least two communication terminal devices, each communication terminal device being associated with one of the plurality of players.*

26. *The communication system according to claim 8, wherein the data comprises karaoke data.*

27. *The communication system according to claim 8, wherein the program comprises a video game.*

28. *The communication system according to claim 8, wherein the data comprises multimedia audio/video data.*

29. *The communication system according to claim 28, wherein the multimedia audio/video data comprises a movie.*

30. *The communication system according to claim 8, wherein the communication terminal device further comprises a display means for displaying one of the program and data via a scrollable list, the scrollable list respectively displaying a plurality of available programs or data stored at the host facility.*

31. *The communication system according to claim 8, wherein the communication terminal device is further configured to connect over telecommunication lines to at least another communication terminal device to facilitate real-time interactive communication between the at least two communication terminal devices regarding the program, the data, or combination of the program and data to support simultaneous interaction among a plurality of players executing the same program on the at least two communication terminal devices, each communication terminal device being associ-* ated with one of the plurality of players, and the communication terminal device displays a number of players who can participate in the real-time interactive communication between the at least two communication terminal devices.

32. The communication system according to claim 8, wherein the communication terminal device further comprises a second clock means for keeping a second predetermined time period after said receiving means receives the transmission.

33. The communication system according to claim 8, wherein the communication terminal device further comprises an interference stop instruction means for instructing to stop the interference performed by said interference means in response to payment of an additional charge.

\* \* \* \* \*